United States Patent [19]
Endicott

[11] 3,830,508
[45] Aug. 20, 1974

[54] SHAFT SEAL
[75] Inventor: Donald L. Endicott, Garden Grove, Calif.
[73] Assignee: McDonnell Douglas Corporation, Santa Monica, Calif.
[22] Filed: Nov. 27, 1972
[21] Appl. No.: 309,736

[52] U.S. Cl. .................................. 277/142, 277/93
[51] Int. Cl. .............................................. F16j 15/32
[58] Field of Search ............. 277/81, 84, 85, 86, 93, 277/93 SD, 94, 142, 143, 144, 146, 151, 153, 164, 38, 39, 40

[56] References Cited
UNITED STATES PATENTS
2,760,794   8/1956   Hartranft ......................... 277/93 SD
2,866,670   12/1958  Harris et al. ............................ 277/94
3,712,765   1/1973   Smith .............................. 277/93 SD FOREIGN PATENTS OR APPLICATIONS
907,725   3/1954   Germany ............................. 277/84

Primary Examiner—Louis A. Prince
Assistant Examiner—Robert L. Smith
Attorney, Agent, or Firm—Walter J. Jason; Donald L. Royer; George W. Finch

[57] ABSTRACT

A shaft seal for providing a seal between a housing and a cylindrical shaft movable with respect to the housing. The seal includes an annular seal member having an inner diameter for sealing engagement with the shaft, an outer portion which rests in a recess in the housing and a V-shaped notch adjacent the inner diameter. A spacer member is located adjacent to the face of the seal member, the spacer member having a flat annular shape with a circular protrusion of semi-circular cross-section which is urged into contact with the V-shaped notch by a spring located concentrically about the shaft to thereby cause the seal member to bear against the housing and the shaft and provide a seal between the two.

5 Claims, 5 Drawing Figures

SHAFT SEAL

The invention described herein was made in the performance of work under a NASA contract and is subject to the provisions of Section 305 of the National Aeronautics and Space Act of 1958, Public Law 85–568 (72 STAT. 435; 42 U.S.C. 2457).

BACKGROUND OF THE INVENTION

Conventional spring loaded shaft seals include an internal coil spring concentric about a sealing lip of the seal and the shaft which squeezes the sealing lip into contact with the shaft. Differential pressure across the seal in the proper direction maintains the seal. Usually the space about the sealing lip is limited so it is impossible to obtain a large range of differing seal forces especially toward the heavy side with these conventionally designed spring loaded seals. Also, the coil spring must be in place to load the lip before the seal is installed. This loading makes the conventional seal difficult to install and susceptible to damage during installation.

SUMMARY OF THE INVENTION

The present invention is for providing a seal between a housing and a cylindrical shaft which may rotate or move with respect to the housing and includes an annular seal member, a spacer member and a spring. The annular seal member nests in the housing and has an inner diameter which surrounds the shaft, a V-shaped notch adjacent to the inner diameter and a relieved portion therebehind for forming the lip of the seal. The spacer member is of a flat annular shape with a protrusion having a nose of generally semicircular cross-section located on one face thereof. The protrusion is forced into contact with the inner portion of the V-shaped notch in the annular seal member by the spring to cause the seal member to bear against the housing and the lip to bear against the shaft creating a sealing relationship between the shaft and the housing. Both axial and radial seal loading is provided by the spring eliminating the need for separate axial and radial loading means heretofore required in conventional shaft seals.

The present seal can be used in very small or inaccessible areas without limitation as to the size of loading spring which can be utilized. Also, a wide range of seal loading is available by selective design of the components. For example, varying amounts of seal loading force can be applied to the sealing lip by changing the radius of the protrusion nose, the contour of the adjacent flank portions of the protrusion or both. Additional control of the seal loading forces also can be obtained by varying the angle of the V-shaped notch in the seal which receives the loading from the spacer protrusion. Additionally, the stand off height of the spacer loading section can be varied to provide different limits in seal radial loading since the base of the spacer is designed to bottom on the flat portion of the seal under predetermined loading conditions. Any additional loading beyond this level is absorbed by compression of the material of the annular seal member. The annular seal member can be made from numerous materials such as rubber, or plastics such as polytetrafluoroethylene, polyimide and the like. By matching the modulus of elasticity of the material from which the annular seal member is made to the axial loading provided by the spring, a fixed limit in seal radial loading can be obtained. This feature allows the designer to select the desired seal radial loading regardless of the size or spring rate of the spring. This is important since the spring may be a pre-existing spring whose primary function is to do something else like spring load the shaft.

The normal considerations of sealing efficiencies, service life, and seal loading limits apply to the present invention, however a much broader range of loading is possible within the same space limitations. Since the seal radial forces are generated through the use of a single external spring instead of the conventional internal concentric spring, a larger selection of the spring loading rates is possible. This is particularly important where the seal cavity is limited to small sizes but where relatively large seal radial loading is desired such as when pressure differentials are expected across the seal in both directions.

The present seal is also easier to install than conventional seals because the seal is not spring loaded when installed but instead is loaded after installation by installation of the external spring. This reduces the chances that damage will occur to the sealing surface of the seal.

It is therefore an object of the present invention to provide a seal for annular shafts which can provide a wide range of seal loadings without requiring an excess amount of space.

Another object is to provide a lip seal which is less expensive than conventional seals.

Another object of the present invention is to provide a lip seal which can be loaded to a high sealing load without danger of overloading.

Another object is to provide a lip seal which can be used on any shaft and housing point where a return spring exists such as the intake valve on an automotive internal combustion engine.

Another object is to provide a lip seal which provides improved sealing on all small size seals.

These and other objects and advantages of the present invention will become apparent after considering the following detailed specification which covers a preferred embodiment thereof in conjunction with the accompanying drawing wherein:

DETAILED DESCRIPTION OF THE SHOWN EMBODIMENT

Figure 1:
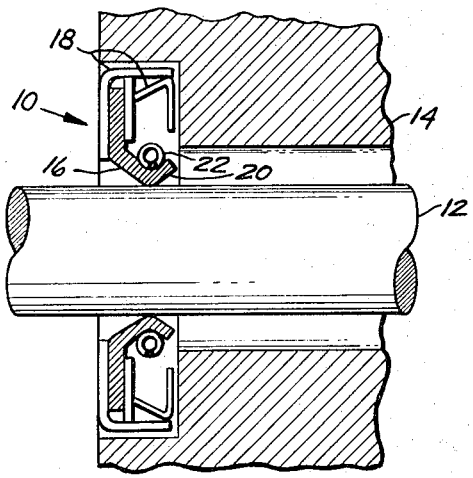
FIG. 1 is a cross-sectional view of a conventional prior art lip seal for an annular shaft.

Referring to the drawing more particularly by reference numbers, number 10 in FIG. 1 refers to a typical prior art shaft seal providing a seal between a shaft 12 and a housing 14. As can be seen, the prior art seal 10 includes a sealing member 16 which is mechanically connected to the housing 14 by clips 18. The sealing member 16 includes an annular lip 20 whose inner diameter is pressed against the shaft 12 by means of an internal coil spring 22. Since the area behind the lip 20 is restricted, the spring 22 is restricted in size and therefore can apply only limited amounts of sealing force to the lip 20. The limited amount of sealing force restricts the use of the seal 10 to those applications where the differential pressure applied thereacross assists the spring 22 in the maintenance of the seal. Also, due to the construction of the seal 10, the spring 22 must be in position backing up the lip 20 when the seal 10 is installed about the shaft 12. Such installation is relatively difficult and it increases the changes that the sealing member 16 will be damaged during the installation operation. The net result of the problems inherent in the design of seal 10 is that it is not adaptable to a wide range of requirements and therefore must be specially designed for practically every application.

Figure 3:
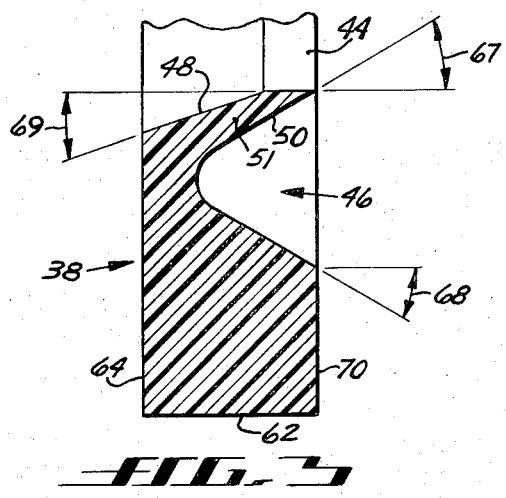
FIG. 3 is an enlarged partial cross-sectional view of the annular seal member of the present invention shown in its unstressed shape.
Figure 2:
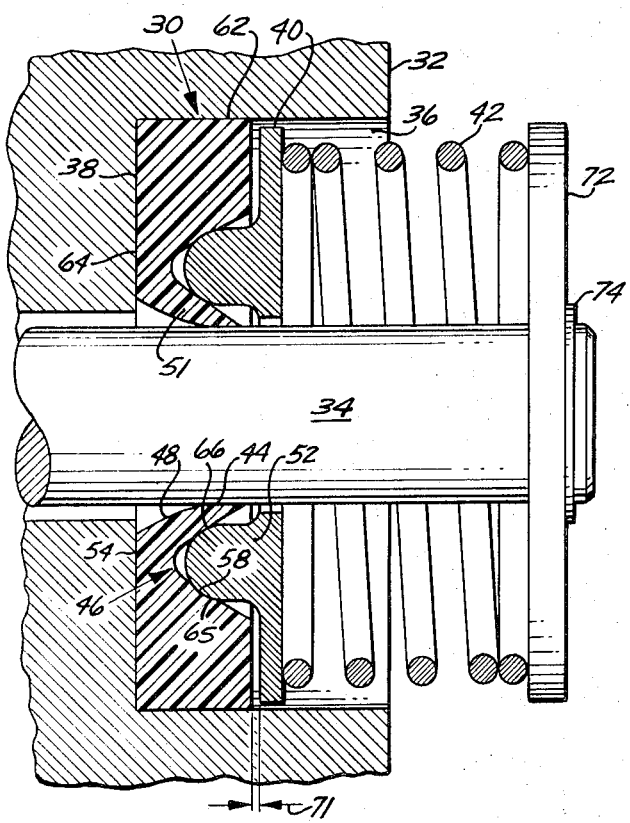
FIG. 2 is a cross-sectional view of a seal constructed according to the present invention installed in a housing about a shaft.

The present shaft seal 30 as shown in FIG. 2 has been developed to overcome the disadvantages of the conventional prior art seals 10. The seal 30, like seal 10, is designed to form a sealing connection between a housing 32 and a shaft 34 and, like seal 10, is designed to nest in a small annular hole 36 in the housing 32 which is in axial alignment with the shaft 34. The present seal 30 includes an annular seal member 38, a spacer 40 and a compressed spring 42. The annular seal member 38 whose cross-section is shown in greater detail in FIG. 3 has an inner diameterical surface 44 which surrounds the shaft 34 and forms the sealing connection therebetween. The seal member 38 also includes a V-shaped notch 46 adjacent the inner surface 44 and a frusto-conical portion 48 behind the notch so that the innermost sidewall 50 of the notch 46 and the frustro-conical portion 48 define a lip 51 whose tip is the inner surface 44. In FIG. 3 the seal member 38 is shown in its unstressed shape and the inner surface 44 is in fact a cylindrical surface which, when properly installed about the shaft 34, is in axial alignment therewith.

Figure 4:
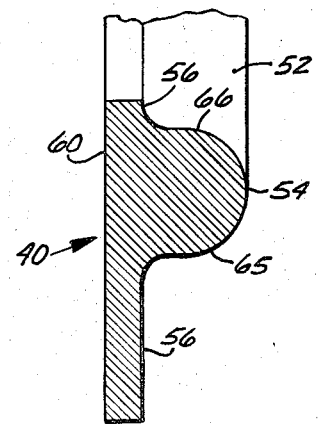
FIG. 4 is an enlarged partial cross-sectional view of the spacer member of the present invention.

The spacer 40, shown in detail cross-section in FIG. 4, has a flat annular shape with a circular protrusion 52 having a nose 54 of generally semicircular cross-section located on one face 56 thereof. The protrusion 52 is forced into contact with the sidewalls 50 and 58 of the V-shaped notch 46 by the helical spring 42 which acts against the opposite face 60 thereof. The spacer 40 causes the annular outer surface 62 and the back surface 64 of the seal member 38 to make sealing contact with the annular hole 36 while also forcing the lip 51 to flex inwardly so the inner surface 44 bears against the shaft 34 and effects a sealing relationship between the shaft 34 and the housing 32. It should be obvious that the spring 42 provides both the axial and radial seal loading for the seal 30 eliminating the need for separate radial and axial loading means such as the spring 22 and the clip members 18 of the conventional seal 10.

A wide range of seal loading is available by selective design of the components of the present seal 30 so that the seal 30 can be used with differential pressures in either direction thereacross. For example, by changing the radius of the nose 54, the contour of the adjacent flank portions 65 and 66 of the protrusion 52 or both, the leverage between the spacer 40 and the annular seal member 38 can be varied to cause the inner surface 44 to press against the shaft with varying amounts of seal loading force. The seal loading forces can also be varied by varying the angles 67 and 68 of the V-shaped notch 46 or by varying the flexibility of the lip 51 by changing the angle 69 of the relief portion 48 with respect to the angle of the innermost sidewall 50.

Since the seal loading possible with the present seal 30 is not restricted by internal coil springs such as spring 22 used in the prior art seals 10, means must be provided to prevent the overloading of the seal. These means include an abutment surface 70 on the seal member 38 which engages the face 56 of the spacer 40. In FIG. 2 the two surfaces 56 and 70 are shown with a stand-off height 71 therebetween showing that the seal 30 is not loaded to its maximum value. The spring 42 is shown typically caged between the spacer 40 and a disc 72 attached to the shaft 34 by a clip 74 where axial movement of the shaft 34 can cause increased loading of the seal surface 44. The surfaces 56 and 70 prevent force from overloading the seal and causing it to fail. This is because the spacer 40 is usually constructed from material such as steel which is relatively rigid and once the surfaces 56 and 70 come in contact the overload is absorbed by the compression of the seal member 38. By choosing the proper modulus of elasticity of the material of the seal member, a fixed limit in seal loading is obtained. As aforesaid, typical materials for the seal member include rubber or plastic such as polytetrafluoroethylene, polyimide and the like. Plastic materials such as polytetrafluoroethylene are particularly desirable because of their ability to creep or grow under pressure. This enables the seal member 38 to grow inwardly due to the forces thereon to compensate for wear of the lip 51.

Figure 5:
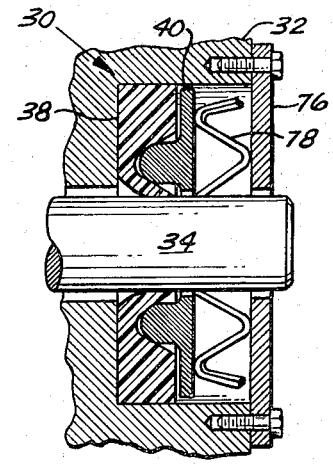
FIG. 5 is a reduced cross-sectional view of a seal with a different type spring mounted in a housing.

The spring may also be caged in the housing 30 rather than to the shaft 34 as shown in FIG. 5 if the application for the seal 30 so indicates. Also, in FIG. 5 a serpentine flat spring 78 is shown to illustrate that many different types of springs can be employed in conjunction with the present seal 30.

Thus there has been shown and described novel shaft seals which fulfill all of the objects and advantages sought therefore. Many changes, alterations, and other uses and applications of the subject shaft seals will become apparent to those skilled in the art after considering this specification and the accompanying drawing. All such changes, modifications, variations and other uses and applications which do not depart from the spirit and scope of this invention are deemed to be covered by the invention which is limited only by the claims which follow.

What is claimed is:

1. A seal for providing a seal between a housing and a shaft which passes therethrough, said sealing including:

an annular seal member constructed from a relatively resilient material, said seal member when unstressed having an outer diameter surface and a back surface for sealing engagement with the housing, a front surface having an abutment portion and a circular notch of V-shape cross-section defined therein, and an inner surface having a cylindrical portion of a diameter about the diameter of the shaft and a frusto-conical portion extending from said cylindrical portion to said back surface, said V-shaped notch and said frustro-conical portion defining a sealing lip tipped by said cylindrical portion;

an annular spacer member constructed from a relatively rigid material, said spacer member having an inner diameter larger than the shaft diameter, front and back side faces with said front face including an abutment portion, and a circular protrusion having a semi-toroidal nose which extends from said front face; and bias means for applying force against the back surface of said spacer member, said bias means forcing said protrusion into said V-shaped notch to press said seal member against the housing and said lip against the shaft, said abutment portions of said spacer member front face and said seal member front face being positioned to come into abutment when a predetermined force is applied to said spacer by said bias means, any additional force being absorbed by the resilience of said seal member.

2. The seal defined in claim 1 wherein said V-shaped notch has side walls which are at about 30° angles to said inner surface and wherein said frustro-conical portion is at an angle of about 20° to said inner surface.

3. Sealing means including:

an annular shaft;

a housing about a portion of said shaft, said housing having an interior cylindrical surface in axial alignment with said shaft and an adjacent flat surface perpendicular thereto to define an annular hole about a small portion of said shaft;

an annular seal member constructed from relatively resilient material and when unstressed having for an outer diameter and a back surface for sealing engagement with said housing, a front surface having an abutment portion and a circular notch of V-shape cross-section defined therein, and an inner surface having a cylindrical portion of a diameter about the diameter of said shaft and a frustro-conical portion extending from said cylindrical portion to said back surface, said V-shaped notch and said frustro-conical portion defining a sealing lip tipped by said cylindrical portion;

an annular spacer member constructed from relatively rigid material and having an inner diameter larger than said shaft diameter, front and back side faces with said front face including an abutment portion, and a circular protrusion having a semi-toroidal nose which extends outwardly from said face; and bias means for applying force against the back surface of said spacer member, said bias means forcing said protrusion into said V-shaped notch to press said outer diameter and back surfaces of said seal member against said housing and said sealing lip against said shaft, said abutment portions of said spacer member front face and said seal member front surface being positioned to come into abutment when a predetermined force is applied to said spacer by said bias means, any additional force being absorbed by the resilience of said seal member.

4. The sealing means defined in claim 3 wherein said bias means are a spring mounted concentrically about said shaft and caged between said spacer member and said shaft.

5. The sealing means defined in claim 3 wherein said bias means are a spring mounted concentrically about said shaft and caged between said spacer member and said housing.

* * * * *